Jan. 2, 1968  H. SZCZEPANSKI  3,361,110
MACHINE FOR HANDLING SPRAY MASKS

Filed Jan. 28, 1966  8 Sheets-Sheet 1

INVENTOR
HARRY SZCZEPANSKI

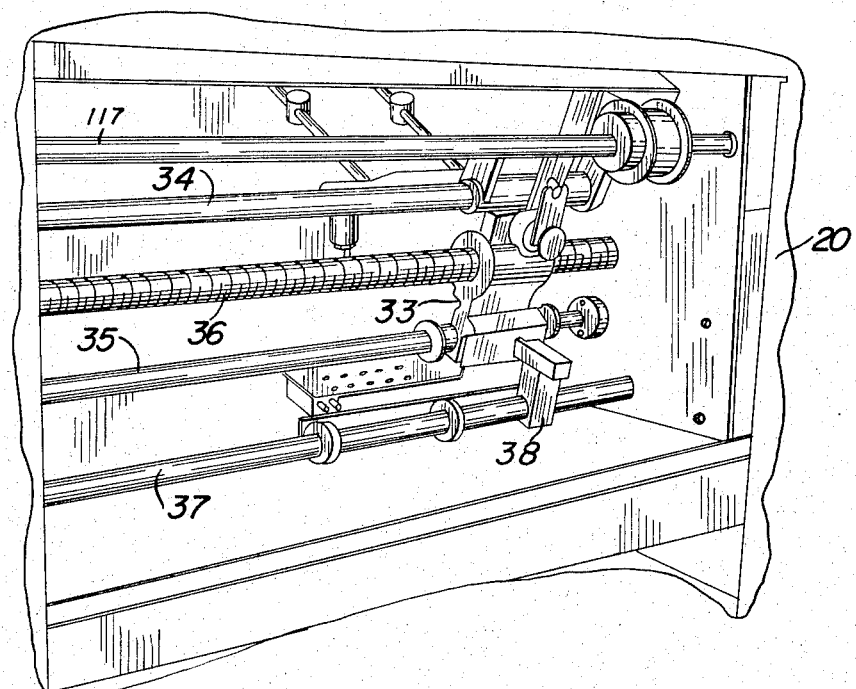
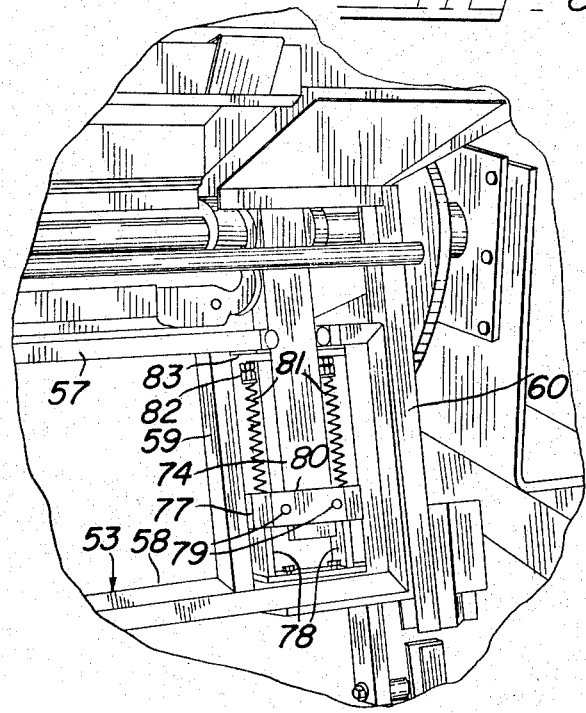

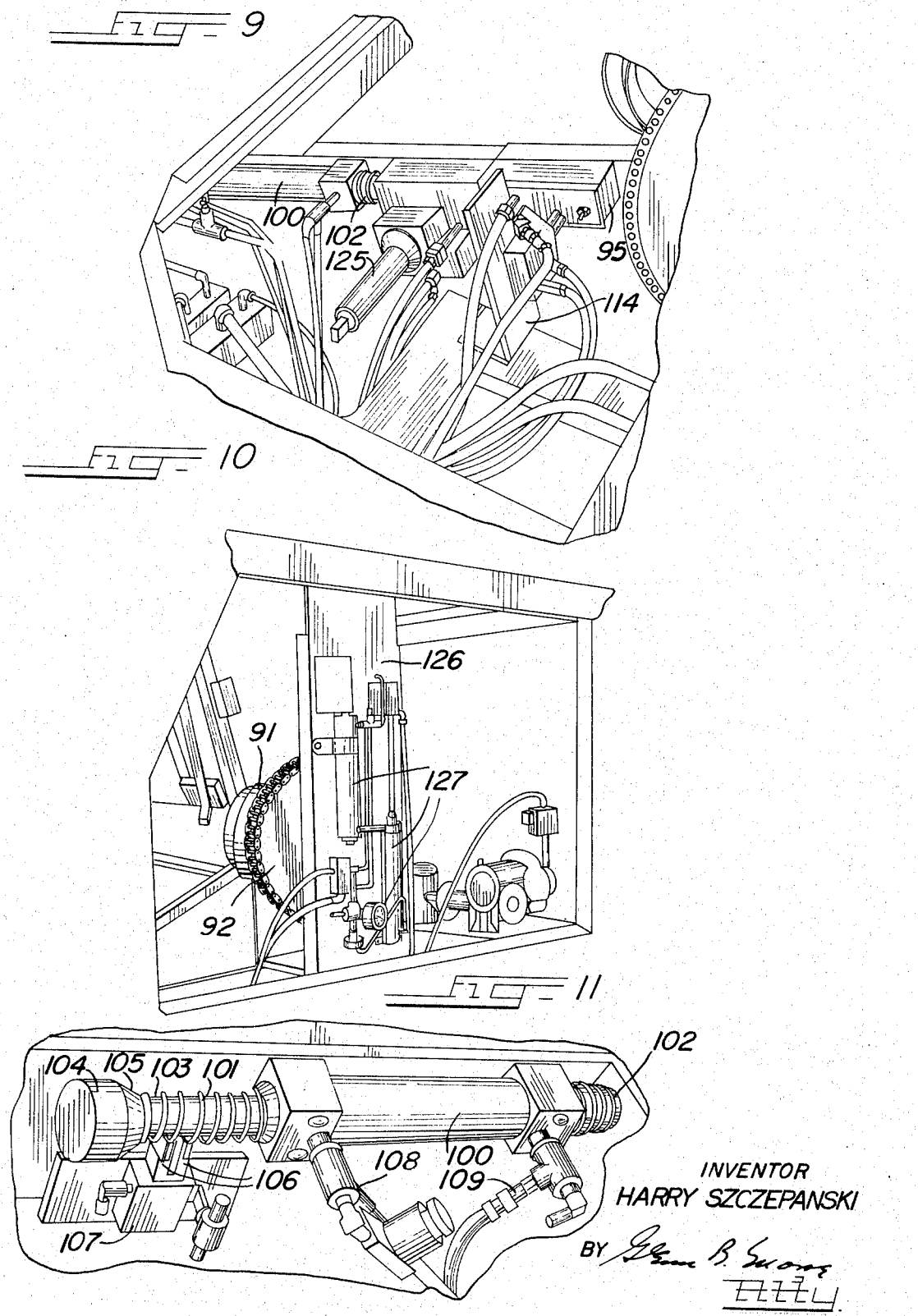

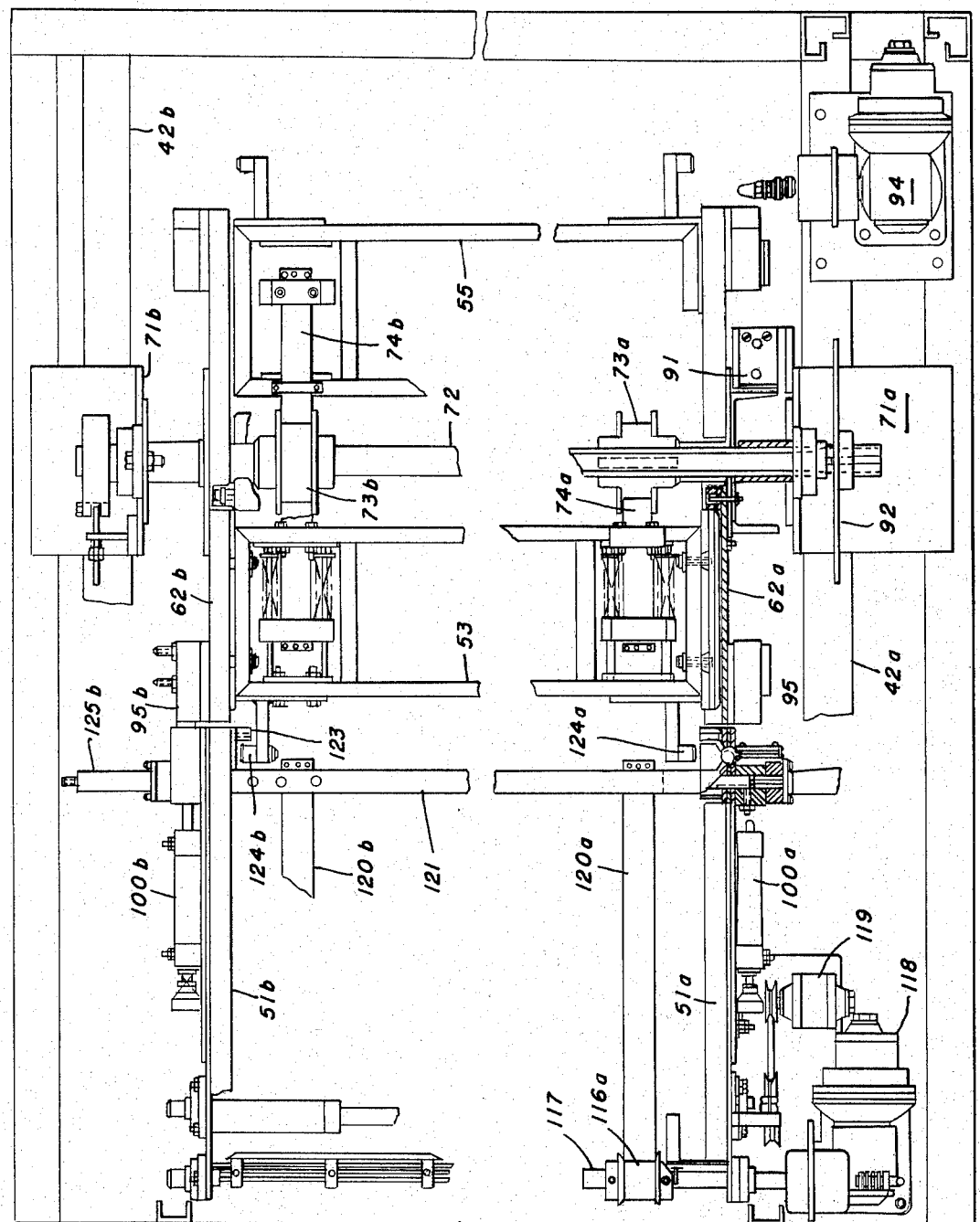

United States Patent Office 3,361,110
Patented Jan. 2, 1968

3,361,110
MACHINE FOR HANDLING SPRAY MASKS
Harry Szczepanski, 755 Oakleigh NW.,
Grand Rapids, Mich. 49504
Filed Jan. 28, 1966, Ser. No. 523,587
10 Claims. (Cl. 118—301)

This invention provides a machine for presenting and cleaning masks associated with spray-painting operations. Preferably, the machine is integrally associated with automatic spraying equipment, and masks are presented by the machine at a work station where they are interposed between the workpieces and the spray equipment. After a relatively short period of use, the masks must be cleaned of accumulations of paint. This cleaning operation has previously caused inconvenient interruption of the painting operations. Automatic machines have been devised for performing the cleaning operations, but the shifting of the masks to the cleaning equipment has either required too much manual intervention, or has been too complex and expensive.

The present invention provides a machine that moves each of a group of masks through a series of positions in sequence, one of these positions being at the work station, and another, a cleaning station. The masks are precisely positioned at the work station for the painting operations, and remain there until a cycle of the machine is initiated either manually or automatically (as by a selected number of spray operations). The mask is then withdrawn by the machine, and a fresh mask presented immediately for use.

The several features of the invention will be analyzed in detail through a discussion of the particular embodiments illustrated in the accompanying drawings. In the drawings:

FIGURE 7 is a perspective view of a conventional form of automatic paint-spraying equipment perferably used in conjunction with the machine.

FIGURE 8 is a perspective view showing the resilient terminal for the flexible tension band used for positioning the mask carriers.

FIGURE 9 is a perspective view showing the locking mechanism at the opposite end of the machine from that shown in FIGURE 5.

FIGURE 10 is a perspective view showing the central structure at the drive end of the machine.

FIGURE 11 is a perspective view of the actuator for the locking bolt.

FIGURE 12 is a sectional view on a substantially horizontal plane.

Figure 1:
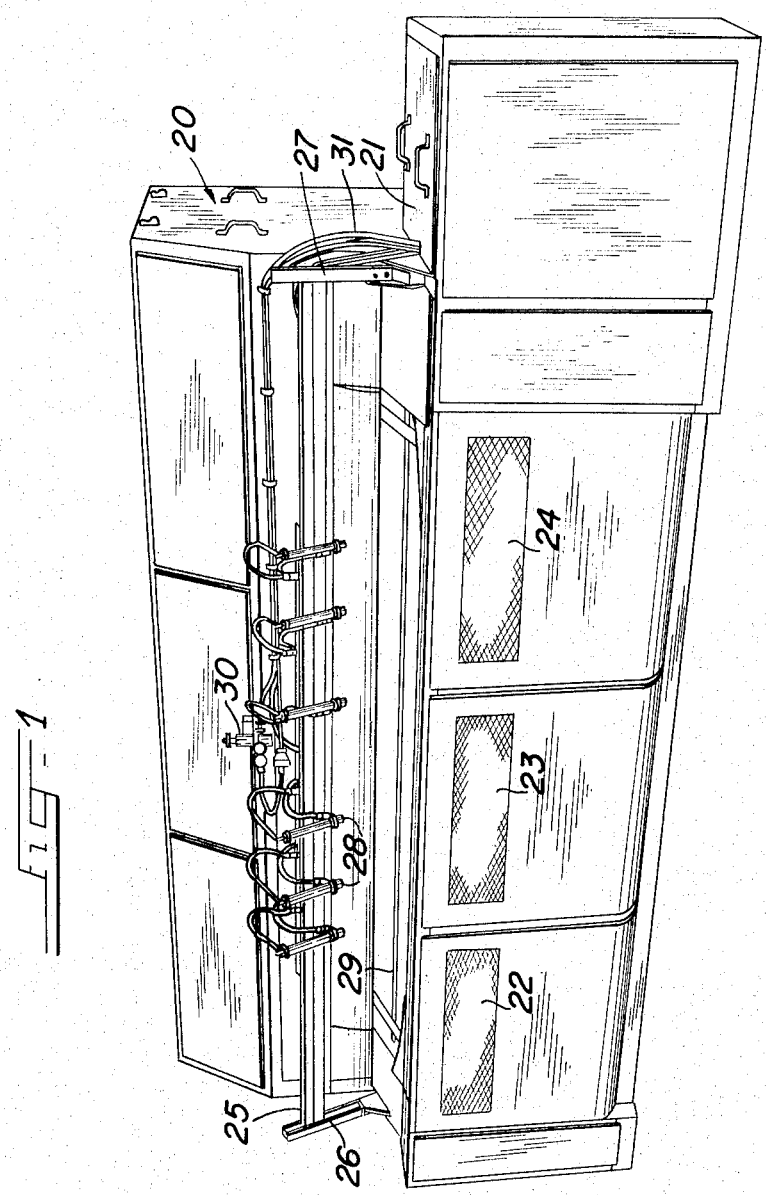
FIGURE 1 is a perspective view of the exterior of the machine embodying the present invention.

The machine shown in FIGURE 1 has a cabinet generally indicated at 20 including the section 21 which accommodates controls and related equipment. The front of the cabinet is provided with the grilles 22–24 for the entrance of ventilating air. A beam 25 mounted on the posts 26 and 27 supports a group of pneumatic hold-down devices 28 which are essentially piston-cylinder assemblies adapted to apply a gentle downward pressure to hold workpieces placed upon the work station generally indicated at 29. The work station is essentially an opening in the cabinet 20 opposite which a mask is presented by one of the mask-carriers of the interior mechanism of the machine. The air-control device 30 is associated with the various supply conduits leading to the hold-down units 28, and the delivery conduits 31 lead to the control mechanism housed in the housing section 21. A workman would normally stand facing the machine as viewed in FIGURE 1, and would place objects to be painted on the area indicated at 29. He would then actuate the controls of the machine to activate the hold-down devices, and the workpiece would be held gently against a conventional spray mask. The automatic spray-painting equipment indicated at 32 in FIGURE 2 is then caused to proceed through its normal cycle back and forth underneath the workstation 29, resulting in the projection of a spray of paint upwardly against the mask, and through the interstices of the mask on to the workpiece.

The spray gun assembly 32, and the gun-carrier assembly 33 supporting it, are conventional, and form no part of the present invention. The carrier 33 is slidably mounted on the guide rods 34 and 35, and is positioned along these rods by the action of the long screw shaft 36. The control rod 37 is primarily for the purpose of supporting control assemblies as shown in 38, preferably at opposite ends of the machine, for determining the reciprocating movement of the carrier 33. The rod 37 may also be used to support a coil of conduits associated with the moving carrier 33. The conduits are not themselves shown in the drawings, other than the coils generally indicated at 38 in FIGURES 2 and 3, as the number of them would obscure the showing of the mechanical details.

Figure 2:
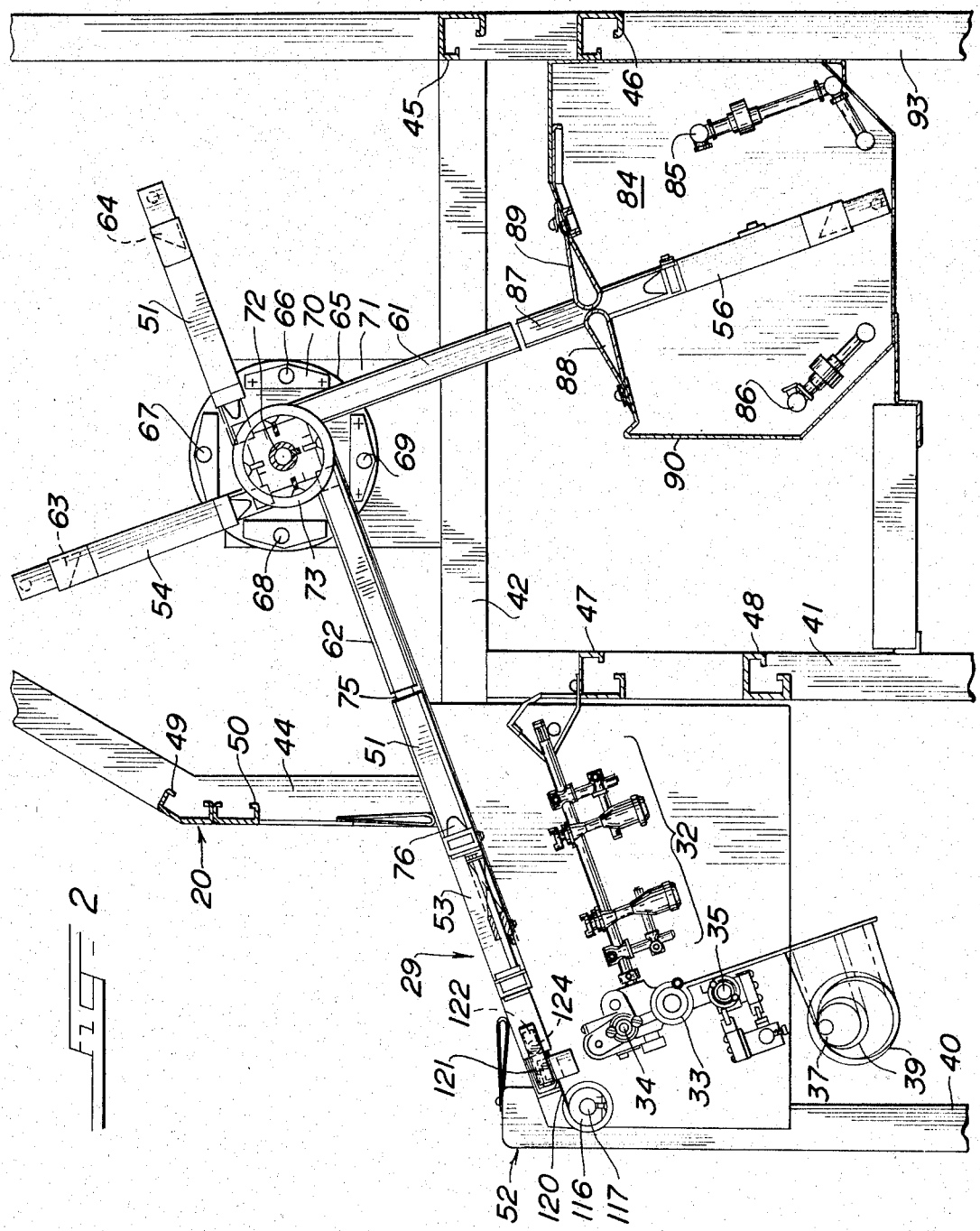
FIGURE 2 is a sectional elevation through the central portion of the machine shown in FIGURE 1.
Figure 4:
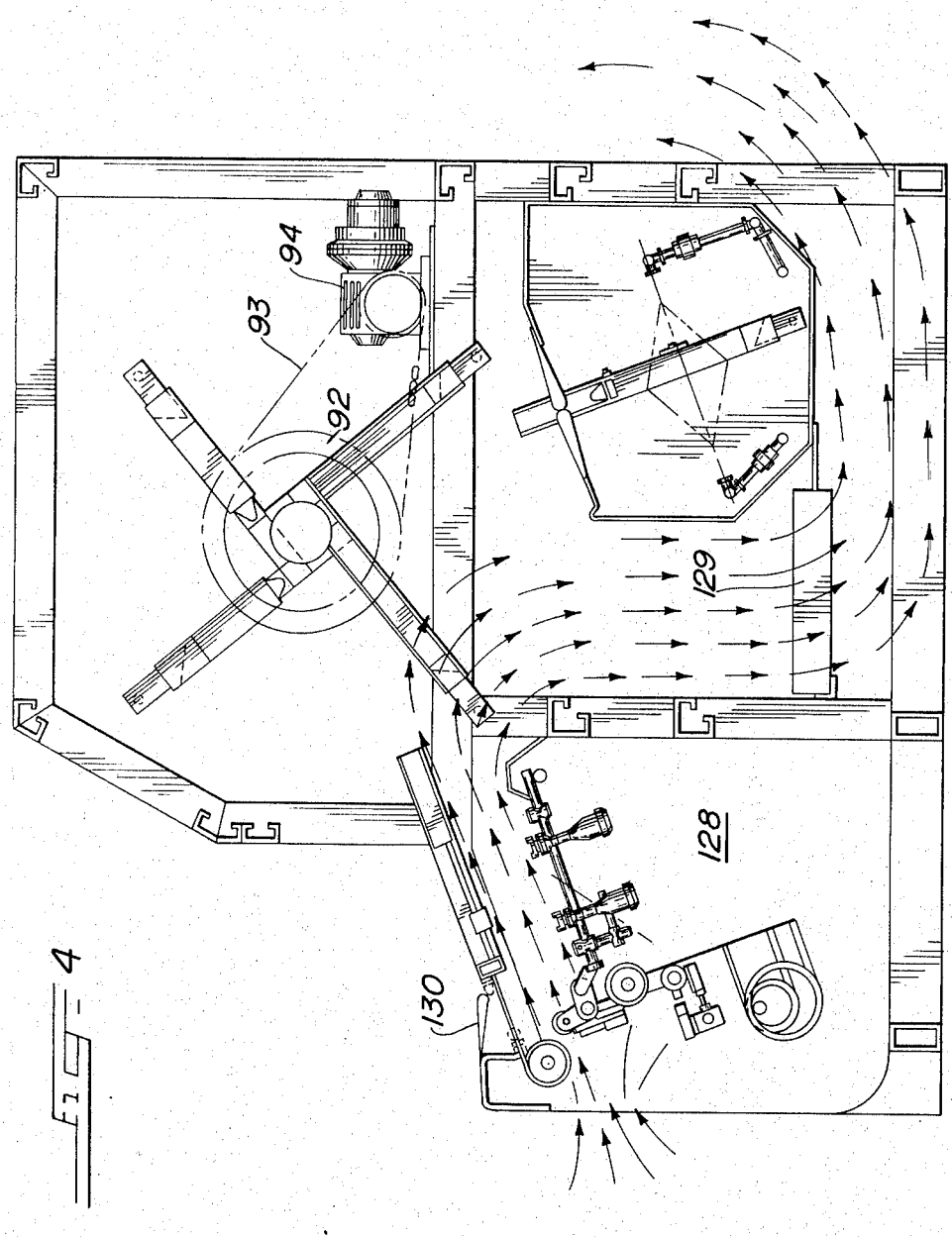
FIGURE 4 is a view similar to FIGURE 2, but showing the rotor structure in an intermediate position.

Referring to FIGURE 2, the cabinet 20 encloses a framework which is of generally conventional structural arrangement, and includes a group of vertical and horizontal beams as shown at 40–50. Any of the related structure secured to these members to form the support of the working mechanism may also be considered as part of the framework. A pair of parallel channel-shaped guideways 51 are disposed at opposite ends of the workstation 29 at a downward inclination from the central part of the machine toward the front area generally indicated at 52. These workstation guideways receive the mask carriers 53–56 in succession as the machine goes through its cycles of operation. Each of the carriers is essentially a rectangular framework of steel of a length sufficient to extend across a workstation 29, and of a transverse dimension as shown in FIGURES 2 and 4. The details of the carriers themselves are best shown in FIGURE 8, which shows an enlarged view at one end of the machine. The opposite end of the carrier is similar in construction. The long rails 57 and 58, together with the cross rails 59 and 60 (including the similar cross rails at the opposite end) form a solid structure to which masks can be secured in any conventional fashion. This heavy structure securely protects the masks during the handling operations involved in the cycles of the machine operations.

The mask carriers are fed successively into the workstation guideways 51 from the pairs of guideway elements 61–64. Members constituting each of these pairs are disposed at opposite ends of a rotor assembly, which includes not only the guideway elements, but a beam structure of any convenient arrangement which extends between the hubs 65. The illustrated beam structure includes a group of rods 66–69 having mounting flanges as shown at 70 at the opposite ends for securing to the hub plates 65. This rotor structure is rotatably mounted in the brackets 71 at the opposite sides of the machine, which are supported by the horizontal members 42 of the framework. As the rotor structure is indexed ninety degrees about its axis of rotation, the guideway elements are successively brought to a position of alignment with the workstation guideways 51.

A shaft 72 is rotatably mounted with respect to the guideway elements 61–64, and also with respect to the framework, with the shaft 72 and the rotor structure being coaxial. The shaft carries a reel 73 at the opposite ends, and each of the reels 73 carries a group of four thin flexible bands of metal. Each of these is connected at its outer ends respectively with one of the carriers 53–56. Rotation of the shaft 72 in a counterclockwise direction, as shown in FIGURE 2, will result in winding up all of the bands 74, and thus drawing all of the carriers toward the axis of rotation of the rotor structure. The carrier 53, in the course of this movement, will move across the junction 75 between the end of the guideway elements 62 and the work station guideways 51, and will be aided in this movement by the rounded nose 76. As the rotation of the reels 73 continues, a point will be reached in which all of the carriers are at the inner extremity of their freedom of movement of the guideway elements 61–64. In order that all of the carriers shall be securely held without requiring excessively close control of the point of securing the bands 74 to the carriers, a resilient terminal structure is provided on each of the carriers as shown in FIGURE 8. A block 77 is slidably mounted on the short transverse rails 78, and the bands 74 are secured to the block 77 by the screws 79 holding the clamping plate 80. The springs 81, preferably surrounding suitable guiderods secured by nuts as shown at 82 to the abutment plates 83 apply a tendency to urge the blocks 77 radially outward, and thus apply a resilient tension to the bands 74. As the carriers approach the inner extremity of their freedom of movement in the rotor guideway elements, a point is reached where further rotation of the reels 73 with respect to the rotor will cause the blocks 77 to move radially inward against the action of the springs 81, thus applying a resilient force against the carriers, and a relatively constant tensioning in the bands 74. The four bands 74 are overlaid on each of the reels 73, and opposite rotation of the reels to permit the carriers to move radially outward will simply cause the bands associated with the upper two carriers to move out into slack coils in random loops, while the carriers extending into the workstation are paid out approximately as shown in FIGURE 2.

The space indicated at 84 may be considered as a washing station, and includes a group of spray guns as shown at 85 and 86 disposed to throw a stream of solvent on carriers in the position of the carrier 56 in FIGURE 2. The washing station has a pair of opposite parallel guideways 87 which lead into the washing station from the rest position of the guideway elements in the position of the elements 61 of FIGURE 2. The angle of downward inclination of the guideway elements 61 and the wash station guideways 87 is close enough to the vertical that the action of gravity will suffice to pull the carriers down into the position of the carrier 56. Suitable automatic control mechanism (not shown) will activate the spray guns 85 and 86 when the carriers have reached the final position shown in FIGURE 2, and the spray guns will preferably be turned off at least prior to the outward movement of the carriers from the wash station. The flaps are preferably of a relatively thin flexible material which can be inflated with a very light air pressure to maintain the closure. The rate of evaporation of the usual solvents used for the washing operations is sufficiently great as to justify the use of the flaps 87 and 88 to prevent excessive loss, even though the vapors that escape will be removed by the ventilation equipment.

The rotation of the rotor structure which includes the guideway elements 61–64 is restrained with respect to the framework of the machine by a brake mechanism as shown at 91. The shaft 72 is driven by the sprocket wheel 92 through the chain 93 from power delivered by the motor unit 94. The sole means for rotation of the rotor assembly is through tension applied to the bands 74 as the mask carriers arrive at the inner extremity of their freedom of movement in the guideway elements 61–64. It will be noted that this tension in the bands, due to the tangential relationship, will apply a torque to the entire rotor assembly only when the resulting tension in the bands produces a torque in excess of the restraining effect of the brake 91. The value of the resilient band terminal shown in FIGURE 8 is largely in the prevention of a slamming action as the carriers arrive at the inner end of their freedom of movement. A full cycle of the operation of the machine will therefore consist in a rotation of the reels 73 with the components in the position shown in FIGURE 2. As the bands 74 are progressively wound up, all of the carriers will move into the guideway elements 61–64, and arrival at the inner extremity of this movement will result in beginning a rotation of the entire rotor assembly of 90 degrees until the next pair of guideway elements arrives at a position opposite the workstation guideways 51. This same movement will have brought a succeeding pair of guideway elements opposite the wash station guideways 87. On arrival at this position, the machine will be stopped by suitable conventional automatic controls, followed by a reversal of rotation of the shaft 72 and the reels 73. This will permit the mask carriers to move down into the workstation and wash station guideways, with the bands in the upper two positions extending out in random fashion.

Figure 3:
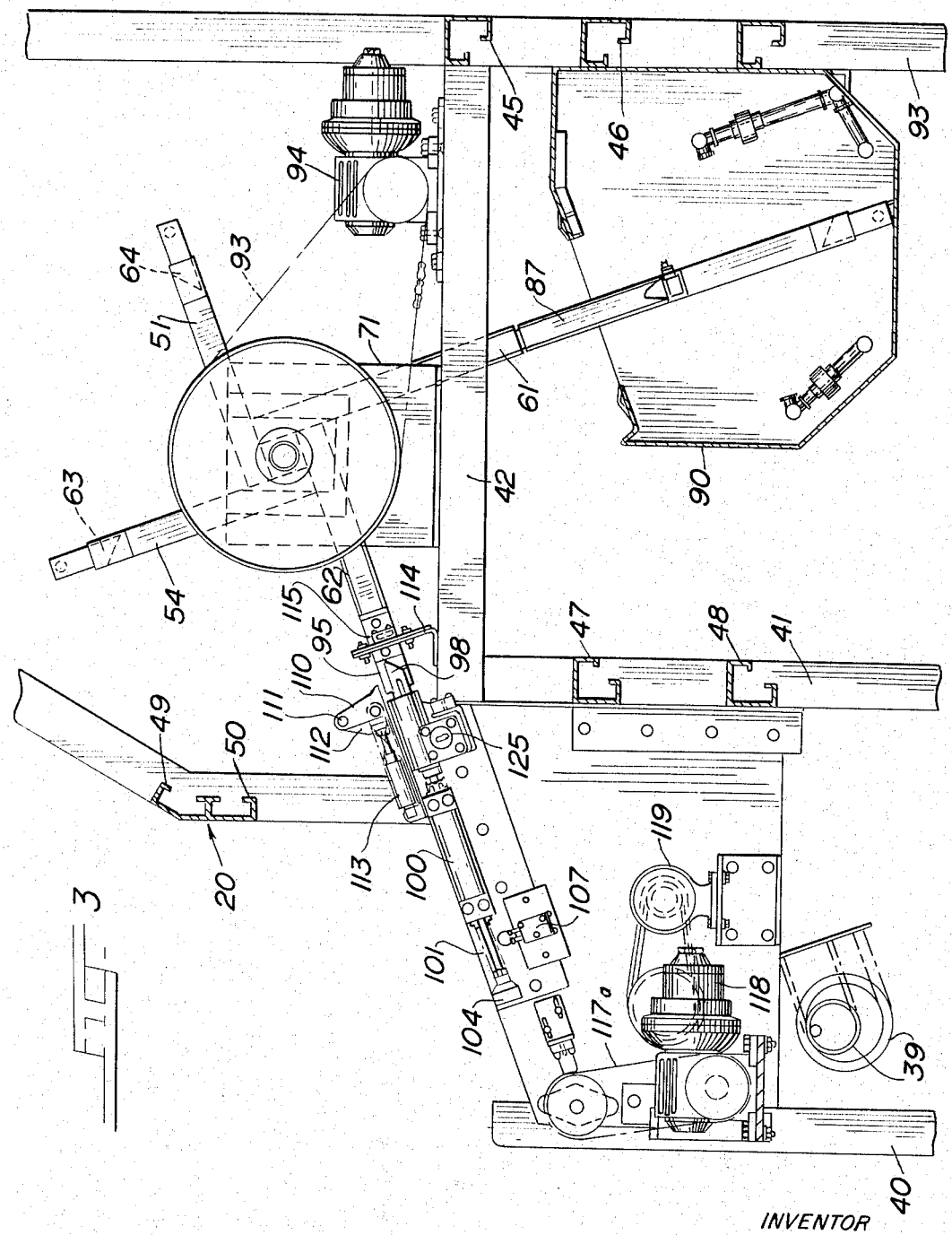
FIGURE 3 is an end elevation of the machine shown in FIGURE 1.
Figure 5:
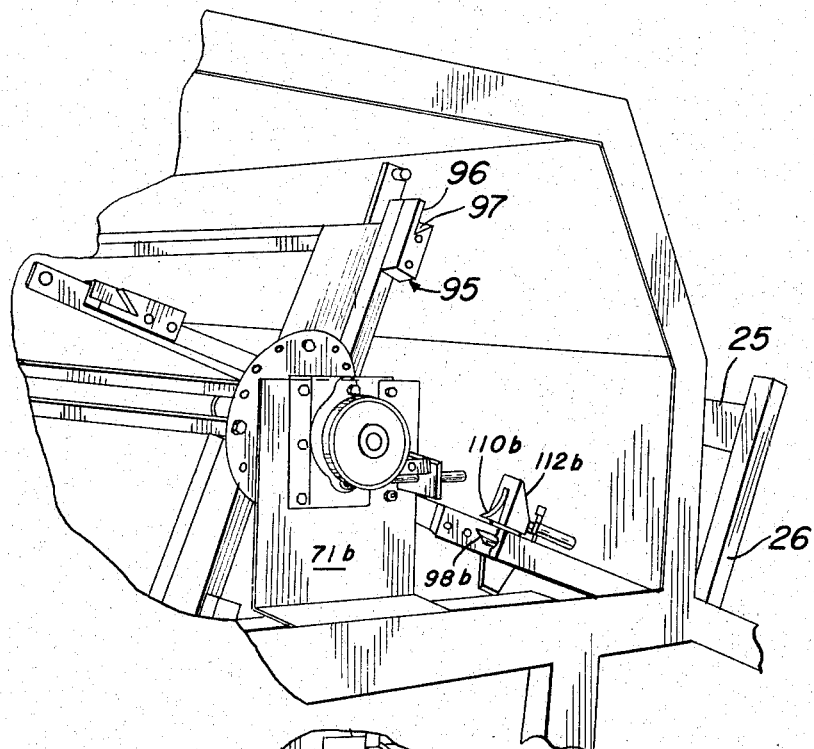
FIGURE 5 is a fragmentary perspective view on a somewhat enlarged scale showing the supporting structure at one end of the rotor assembly.
Figure 6:
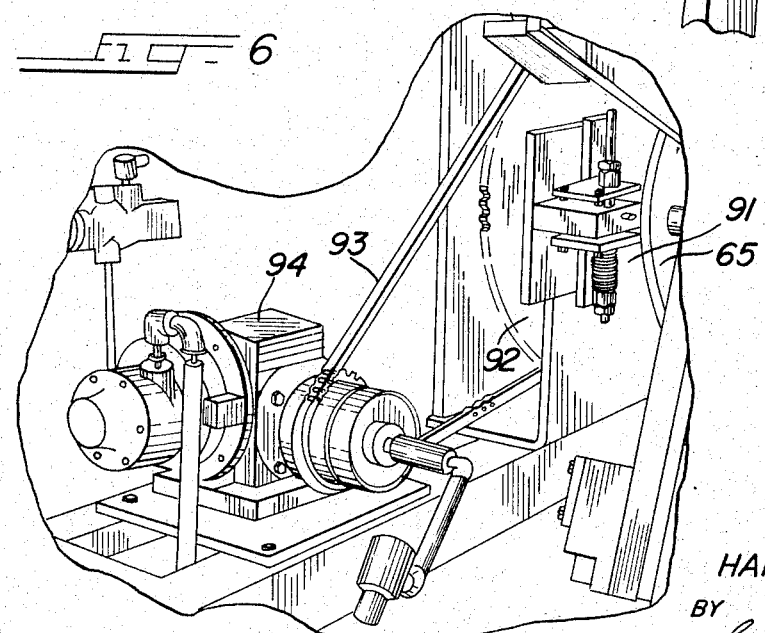
FIGURE 6 is a fragmentary perspective view showing the drive mechanism, at the opposite end of the rotor assembly from FIGURE 5.

The accurate placement of the rotor guideway elements with respect to the workstation guideway (and therefore with respect to the wash station guideway as well) is rendered more positive by the mechanism shown in FIGURE 3. Each of the rotor guideway elements is provided with a block 95 mounted on the outer end faces of the guideway elements. These blocks are best shown in FIGURE 5, and include a surface 96 generally parallel with the guideway elements, and a wedging surface 97. A bolt 98 is slidably mounted in the structure 99 mounted on the frame of the machine, and the upper surface of the bolt is positioned for engagement with the surfaces 96 of the blocks 95. The wedge surfaces 97 do not extend radially as far as do the surfaces 96, and therefore the bolt 98 may be partially withdrawn to a position in which they clear the radially outer extremity of the surfaces 97. In this position, they will still engage the surfaces 96 to provide a stop to the rotation of the rotor assembly. The bolt may also be fully retracted to the point where the rotor assembly may be free to rotate. When the bolt has been partially withdrawn to the intermediate, or "stop" position and has terminated the rotation of the rotor, the bolt will then be automatically shot forward to the fully projected locking position shown in FIGURE 3 through engagement with the wedging surface 97. The movement of the bolts is preferably controlled by air cylinders 100, and the intermediate position of the bolt may be determined by the interaction of the springs 101 and 102 which surround a shaft 103 secured to the bolt itself. The head 104 has a beveled surface 105 for cooperation with the detectors 106 associated with control mechanism in the box 107 for interrelating the bolt position with the movement of the rotor assembly. The air cylinder 100 is provided with air pressure by the conventional conduit mechanism indicated at 108 and 109.

It is preferable to include a retarding mechanism to slow down the rotation of the rotor just prior to the engagement of the blocks 95 with the bolt 98. This mechanism includes the cam 110 pivotally mounted at 111 on the bracket 112 secured to the frame of the machine. The air cylinder 113 applies a gentle force to the cam 110 in a counterclockwise direction. As the rotor moves the blocks 95 around their circular path of travel, they will engage the cams 110 against the action of the air cylinders 113. This will produce a resistance to rotation, but not sufficient to stop the rotor. The brackets 114 mounted on the frame of the machine provide a pedestal for securing a conventional switch and detector mechanism indicated at 115 forming a part of the total control system for interrelating the components of the rotor-positioning mechanism.

Referring to FIGURE 2, the movement of the mask carriers down into the workstation guideways is facilitated by the reels 116 mounted on the shaft 117 driven by a mechanism which is essentially a power take-off through the chain 117a driven by the motor unit 118. A separate motor unit 119 is preferably used for driving the screw 36 associated with the spray gun carriers, but a common power unit could be used for both mechanisms if suitable clutching and de-clutching mechanism were incorporated. The reels 116 are preferably disposed at opposite ends of the shaft 117, and each carry a band 120 connected to a coupling member 121 mounted for movement along the workstation guideways 51. The coupling member includes bars 122 having lugs 123 with the lugs being positioned to receive the studs 124 mounted on each of the mask carriers when the mask carriers are in position to enter the guideways 51. Tension applied via the bands 120 will then assist in moving the mask carriers down into the workstation. The withdrawal of the mask carriers as the rotor reels 73 are wound up will result in movement of the coupling member out into position to receive the next of the mask carriers. A locking mechanism based upon the air cylinders 125 is incorporated to project a transverse bolt (not shown) against a portion of the coupling member 121 to maintain it in this position until it is fully engaged, and is ready to function to pull the mask carrier into the workstation.

The panel 126 may be incorporated in the framework of the machine as a convenient place to locate conventional components of the pneumatic system indicated generally at 127. The components of the machine are also preferably arranged to provide for a ventilation ducting effect, as indicated by the flow arrows in FIGURE 4. Suction is normally applied at the outlet point at the right side of the figure by connection to a standard ventilation plenum, and the air immediately withdrawn from the spray chamber 128 passes through the filter 129 to entrap as many of the paint particles as possible so that these will not be impinged on the downstream duct surfaces. The filter 29 is easily cleaned and replaced, while cleaning the walls of a duct is a sizeable problem. It is also preferable that the area adjacent the workstation 29 is protected by a flap as shown at 130 to close off the area immediately below the mask carrier, and thus maintain the flow in the desired path through the grilles 22–24.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. A machine for automatically presenting and cleaning masks for spray-painting operations, said machine comprising:
   a frame including spaced work-station guideways leading to and from a paint-spraying station;
   a beam structure rotatably mounted in said frame;
   a plurality of pairs of guideway elements mounted on said beam structure substantially radially with respect to the axis of rotation thereof, said guideway elements being rotatable to positions in alignment with said work station guideways, respectively, to form continuations thereof;
   a shaft rotatably mounted in said frame coaxially with said beam structure, said shaft having reel means secured thereto;
   a mask carirer movably mounted in each of said pairs of guideway elements;
   flexible tension-transmission means connected to each of said mask carriers and to said reel means;
   brake means restraining the rotation of said beam structure with respect to said frame;
   means for selectively rotating said shaft in opposite directions;
   control means for successively and releasably interrupting the rotation of said beam structure at the alignment positions thereof wherein one of said pairs of guideway elements is in alignment with said work-station guideways;
   mask washing means disposed opposite a rest position of said guideway elements remote from said work-station guideways, said mask washing means having receiving guideways in alignment with the ends of said guideway elements in said rest position; and
   means urging said mask carriers radially outward with respect to said beam structure at least when said mask carriers are individually opposite said work-station guideways and said receiving guideways.

2. A machine as defined in claim 1, wherein said work station and receiving guideways are below the axis of rotation of said beam structure, the portions of said frame supporting said guideways constituting a part of the means for urging said carriers radially outward.

3. A machine as defined in claim 1, wherein said pairs of guideway elements are mounted on said beam structure in mutually perpendicular planes.

4. A machine as defined in claim 1, wherein said flexible tension-transmission means is a thin metallic band.

5. A machine as defined in claim 1, wherein said control means includes a retractable bolt mounted on said frame adjacent said work-station guideways, said bolt being engageable with a portion fixed with respect to said guideway elements to lock the same in fixed position with respect to said work-station guideways.

6. A machine as defined in claim 5, wherein said bolt is movable between a fully retracted position, an intermediate position blocking rotation of said beam structure in one direction, and a fully projected position having wedge engagement with said guideway element portion to lock said beam structure against rotation in either direction.

7. A machine as defined in claim 5, wherein said control means also includes a retarding device engageable with said guideway elements to retard rotation of said beam structure prior to the engagement thereof with said bolt.

8. A machine as defined in claim 7, wherein said bolt is positioned in response in part to the rotative position of said beam structure.

9. A machine as defined in claim 1, wherein said means urging said mask carriers radially outward includes a coupling member moveably mounted in said work-station guideways, and transversely engageable with a portion of said mask carriers as said mask carriers move into alignment with said work station guideways, and is disengageable on continuation of the rotary movement of said mask carriers, and also includes means for moving said coupling member in said work-station guideways.

10. A machine as defined in claim 9, wherein said coupling member is pulled toward said work station by flexible tension means wound on at least one reel secured to a shaft rotatably mounted in said frame.

References Cited

UNITED STATES PATENTS 3,104,181  9/1963  Minnick _____ 118—301 XR

CHARLES A. WILLMUTH, *Primary Examiner.*

R. L. BLEUTGE, *Assistant Examiner.*